United States Patent
Sanding et al.

(10) Patent No.: US 7,299,036 B2
(45) Date of Patent: Nov. 20, 2007

(54) MOBILE TELEPHONE HANDSET, MOBILE TELEPHONE SYSTEM AND METHOD

(75) Inventors: Anthony N. Sanding, San Diego, CA (US); Murtuza Chhatriwala, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 139 days.

(21) Appl. No.: 10/956,413

(22) Filed: Sep. 30, 2004

(65) Prior Publication Data

US 2006/0068768 A1  Mar. 30, 2006

(51) Int. Cl.
*H04B 1/38* (2006.01)
(52) U.S. Cl. .................. 455/418; 455/518; 455/403
(58) Field of Classification Search ............. 455/517, 455/418, 419, 518, 403; 707/1, 100; 705/14, 705/1; 709/203
See application file for complete search history.

(56) References Cited

U.S. PATENT DOCUMENTS 6,600,928 B1   7/2003   Ahya et al.
2003/0233364 A1*  12/2003   Nakao et al. ............... 707/100
2003/0236823 A1*  12/2003   Patzer et al. ................ 709/203
2004/0039639 A1*  2/2004   Walker et al. ................ 705/14
2004/0098361 A1*  5/2004   Peng ............................. 707/1
2004/0128151 A1*  7/2004   Mock et al. .................. 705/1
2005/0059418 A1*  3/2005   Northcutt .................... 455/517

FOREIGN PATENT DOCUMENTS

WO    WO 02/25976     3/2002
WO    WO 2004/040923  5/2004

* cited by examiner

Primary Examiner—Joseph Feild
Assistant Examiner—Michael T. Vu

(57) ABSTRACT

A method for creating a contact on a mobile device includes processing a request from a user to create a contact or group. After a predetermined period, if a confirmation of the creation of the contact or group has not been received, then the group is deleted from the mobile device. In one aspect the predetermined time period is measured from the time of the request to create the contact or group. In another aspect, the predetermined time period is longer than the group creation time.

24 Claims, 3 Drawing Sheets

MOBILE TELEPHONE HANDSET, MOBILE TELEPHONE SYSTEM AND METHOD

BACKGROUND OF THE INVENTION

1. Field of the Invention

The present invention relates generally to electronic systems, and more particularly, to mobile communication systems.

2. Background Art

In many parts of the world the use of mobile telephones has become ubiquitous. One popular feature available on mobile telephones is known as push-to-talk. Push-to-talk allows a mobile telephone handset to function similarly to a walkie-talkie. Typically the user selects a contact or group of contacts, presses and holds the talk button and speaks. When the user is done with speaking releasing the talk-button ends that communication. One benefit of push-to-talk is a shorter-than-normal cell phone call. Push-to-talk can also be a more efficient and convenient manner on which to communicate with frequently called parties.

Typically a request for a new contacts or group for use with push-to-talk services are handled and caused to be added to a mobile telephone handset through an external server. Contrastingly, a conventional mobile telephone handset address book service is typically located and processed directly on the mobile telephone handset.

A new push-to-talk contact or group is typically created by sending a request to create the contact or group to the external server. The mobile then waits for a confirmation from the server that the contact or group was created successfully. Until the mobile receives the confirmation the new contact or group will remain pending from the mobile's perspective. Push-to-talk calls cannot be made to pending contacts or groups. Additionally, pending contacts or groups cannot be delete because the mobile telephone handset is waiting for the confirmation from the server.

In some cases the server may not be able to create a contact or group. For example, if a contact is not valid the contact will not be created. Similarly, if one or more contacts in a group are not valid the group will not be created. Typically, the amount of time allowed for creating of a contact or group at the server is limited to a maximum time period known as a group creation time period. The length of the group creation time period can vary depending on the particular carrier, or in some cases the particular server. After the group creation time period expires the server typically deletes the contact or group associated with the specific time period at issue. In conventional systems however, the server does not communicate that the contact or group was not created to the mobile telephone handset.

When the server fails to create a new contact or group of contacts the mobile telephone handset does not delete the pending contact or group. Since push-to-talk calls cannot be made to pending contacts or groups and pending contacts or groups cannot be delete, the pending contact or group of contacts may confuse the user and/or waste resources on the mobile handset, such as memory and space on the mobile telephone user interface. Additionally, when a group is invalid due to a few invalid entries it may be more difficult for the user to contact any contacts that are valid within the invalid group.

SUMMARY OF THE INVENTION

A method for creating a contact on a mobile device includes processing a request from a user to create a contact or group. After a predetermined period, if a confirmation of the creation of the contact or group has not been received, then the group is deleted from the mobile device.

In one aspect the predetermined time period is measured from the time of the request to create the contact or group.

In another aspect, the predetermined time period is longer than the group creation time.

According to another aspect, a computer readable medium, such as a memory, embodies instructions performing a method of operating a mobile device. In one embodiment, the method comprises the steps of: processing a request from a user to create a contact; storing the contact in a memory connected to the processor for a predetermined period of time; transmitting the request to a server; determining whether a confirmation has been received from the server prior to the expiration of the predetermined period of time; and in the event no confirmation has been received prior to the expiration of the predetermined period, then delete the contact from the memory responsive to the determination. These and other features, aspects, and embodiments are described below in the section entitled "Detailed Description."

BRIEF DESCRIPTION OF THE DRAWINGS

The present invention will be described with particular embodiments thereof, and references will be made to the drawings in which.

DETAILED DESCRIPTION

Figure 1:
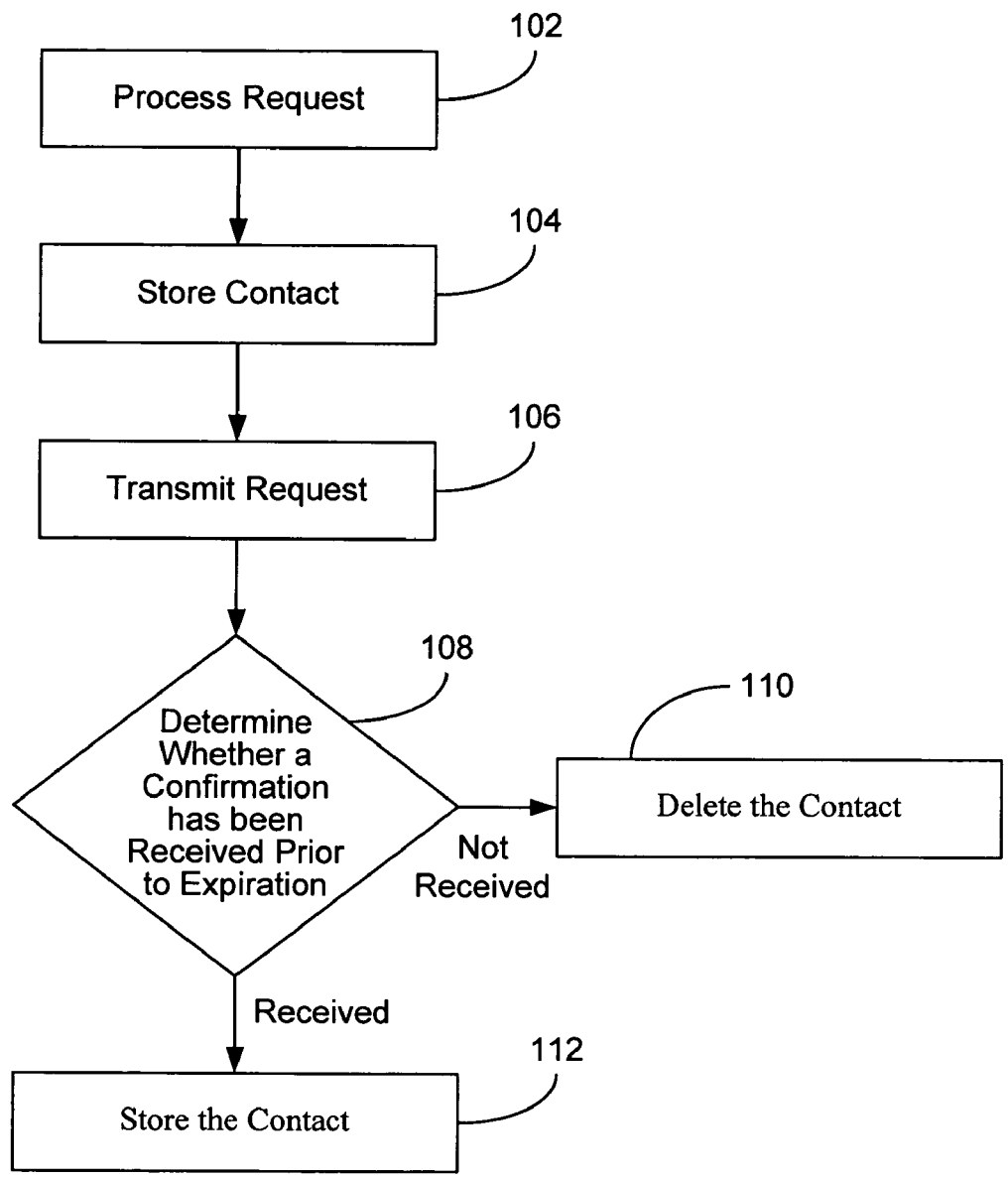
FIG. 1 is a flow chart illustrating an embodiment of the method.

Examples are discussed below generally in the contexts of a mobile device, specifically, a mobile telephone handset. It will be understood that the systems and methods described herein can be applied to any mobile device, including, but not limited to personal digital assistants (PDAs), pagers, etc. FIG. 1 is a flow chart illustrating an embodiment of a method for creating a contact or group of contacts in accordance with the systems and methods described herein. In step 102, a user request to create a contact or group can be processed. In certain embodiments, the user request can be a request to create a contact or group for push-to-talk services. For example, when a subscriber desires to create a new contact or group, the subscriber can elect to do so through the user interface on their mobile device. Once the subscriber has finished imputing the relevant information through the user interface, the mobile device can then generate a request to create the contact or group and formed it to an external server for processing.

In step 104, the contact or group can be stored in a memory location on the mobile device for a predetermined time period. The memory can, for example, be a random access memory, flash memory, or any other type of memory commonly used in mobile electronic devices. Memory will be discussed further with respect to FIG. 2.

In step 106, the request to create a contact or group of contacts can be transmitted to the external server. When the server receives the request, it can be configured to process the request and send a confirmation back to the mobile device. When processing the request the server can be configured to set a group creation timer. In certain embodiments, if the group cannot be created before expiration of the group creation timer, then the server will stop attempting to create the group, however, in conventional systems, the server will not indicate to the mobile device the failure to make the group.

In step 108, therefore, the mobile device determines whether a confirmation has been received prior to the expiration of a predetermined time period maintained on the mobile device. In step 110 the contact can be deleted if a confirmation has not been received prior to the expiration of the predetermined time period. Alternatively, if the confirmation has been received prior to the expiration of the predetermined time period then the contact can be obtained, as illustrated by step 112.

In one embodiment, the mobile device can be configured such that steps 108, 110, and/or 112 occur after the expiration of the predetermined time period. In other embodiments step 108 can occur in conjunction with step 110 and both can occur at any time during the predetermined time period. For example, if a confirmation is received before expiration of the predetermined time period, then the mobile device can be configured to determine that the confirmation was received (step 108) and to store the contact or group (step 112).

In one embodiment, the mobile device can be configured to begin a countdown to determine the expiration of a predetermined time period when it is powered up. In this way groups and/or contacts pending when the mobile device was last powered off can be deleted if the group(s), contact (s) or both are not valid. Alternatively, the mobile device can continue a countdown from where it left off when last powered down. In other embodiments the mobile device can assume the predetermined time period has expired when it powers up and groups and/or contacts that a confirmation has not been received for can be deleted. In another embodiment the mobile device may use time information to determine if a predetermined time period has expired. If the predetermined time period has expired the groups and/or contacts that a confirmation has not been received for can be deleted.

Implementation of the method of FIG. 1 should reduce resources and overhead associated with group creation. As an example, in some cases less memory can be devoted to invalid contacts or groups, because the invalid contact or group can be deleted. Having fewer invalid contacts can also be less confusing for the subscribers.

Figure 2:
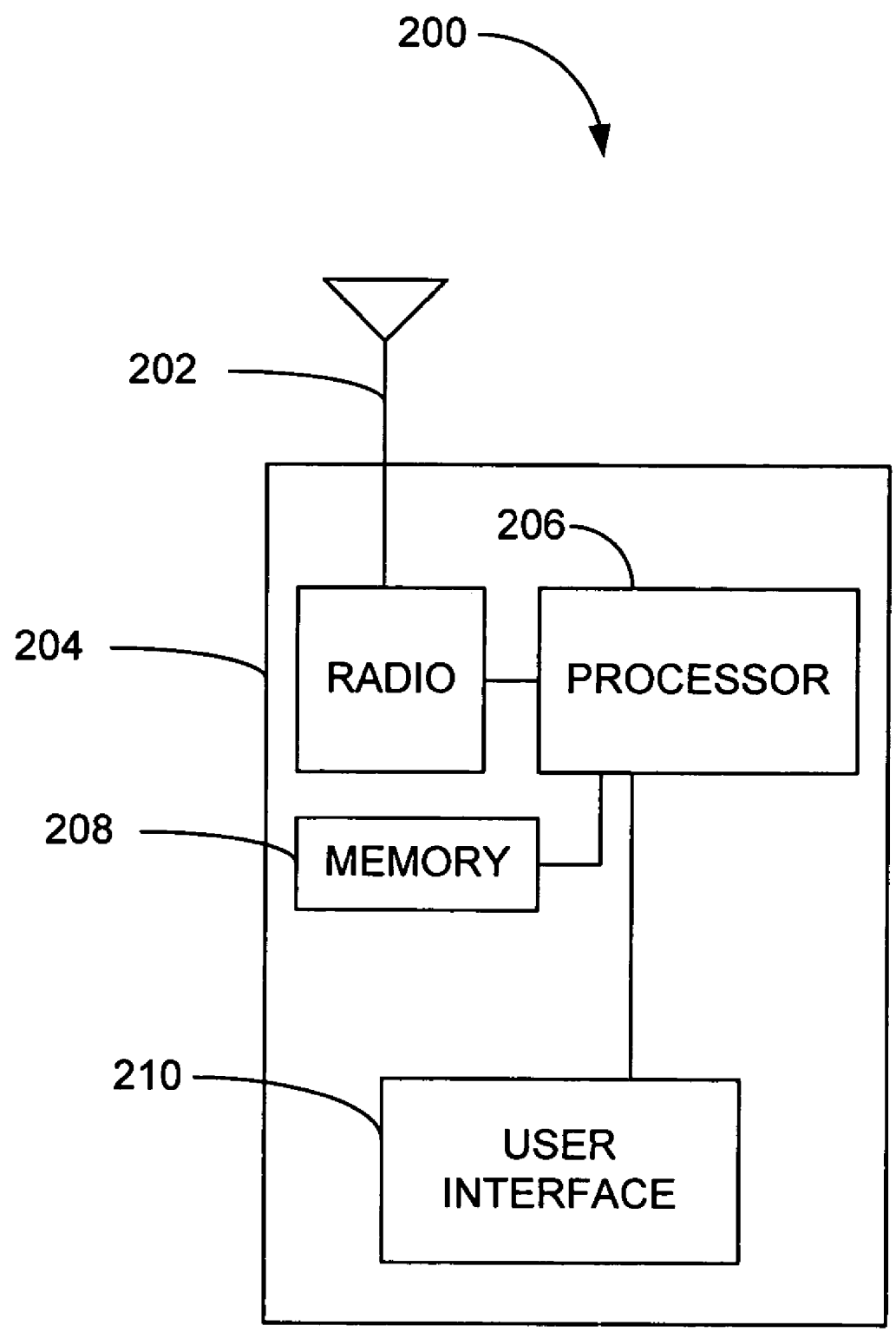
FIG. 2 is a diagram illustrating mobile device in the form of a mobile telephone handset.

FIG. 2 is a diagram illustrating a mobile device, specifically a mobile telephone handset 200 configured in accordance with the systems and methods as described herein. Mobile telephone handset 200 can be configured to perform the steps illustrated by FIG. 1. Mobile telephone handset 200 can include an antenna 202 configured to transmit and receive wireless signals. Antenna 202 is shown as a single antenna; however, it will be appreciated that antenna 202 can be a plurality of antennas, an array of antennas, etc. Additionally antenna 202 is shown as an external antenna, but it will be appreciated that the antenna 202 can be an internal antenna, an external antenna, or a combination of internal and external antenna.

Antenna 202 is connected to a radio 204. Radio 204 can comprise the circuitry necessary to process wireless signals transmitted and received via antenna 202. For example, radio 204 can comprise the filters, demodulators, and analog-to-digital converters necessary to transform wireless signals received via antenna 202 into information carrying baseband signals. Similarly, radio 204 can comprise the filter, modulators and digital-to-analog converters necessary to transform baseband signals into wireless signals that can be transmitted via antenna 202. It will be understood of course that radio 202 can comprise various integrated circuits and/or discrete components. Either some of the circuit or functions typically performed by a radio can be incorporated into processor 206. Accordingly, the embodiment of FIG. 2 should not be seen to limit the systems and methods described herein to any particular design or architecture.

A processor 206 can be connected to radio 204. Processor 206 can be configured to generate and receive the signals processed by the radio and can be configured to control radio 204. Processor 206 can also be configured to control the application of mobile device 200 and to implement the method of FIG. 1. Processor 206 can comprise a microprocessor, digital logic, or a digital signal processor (DSP). Additionally, processor 206 can comprise a mobile station modem (MSM) or an application specific integrated circuit (ASIC). Processor 206 can also be a combination of devices, for example, processor 206 can comprise a microprocessor, a digital signal processor, and digital logic.

Processor 206 can be connected to memory 208, which can be configured to store instructions used by processor 206 to control the operation of device. Memory 208 can store data for processing by processor 206. Memory 208 can be Random Access Memory (RAM), Flash memory, a hard drive, or some combination thereof. Further, memory 208, or a portion thereof, can be removable. Memory 208 can be a device packaged separately from the processor 206. In another embodiment memory 208 can be packaged with processor 206 in a single device.

Accordingly, instructions for causing processor 206 to implement the steps of FIG. 1 can be stored in memory 208 where necessary, processor 206 can be configured to access the instructions in order to create a group or contact as described in relation to FIG. 1. Thus, when a subscriber associated with mobile device 200 decides to create a new contact, the subscriber can indicate this desire via user interface 210.

User interface 210 can comprise a display, keypad, buzzer, or ringer, microphone, speakers, etc. In short, the user interface 210 can comprise the hardware and software required to allow a subscriber to interface with mobile device 200. In certain embodiments this can include a push-to-talk mechanism that allows the user, once a push-to-talk contact is selected to simply push a button and establish communication with that contact.

The subscriber can then use user interface 210 to input information related to the new contact. For example, the subscriber can, in some embodiments, scroll through, or select menu options using user interface 210 in order to indicate a desire to create a new contact via the user interface. Once the information is received via user interface 210 processor 206 can be configured to process the request (step 102). The new contact information can then be stored (step 104) in memory 208, and transmitted via radio 204 and antenna 202 to an external server (step 106)

Mobile device 200 can also comprise a time set for a predetermined time period. Processor 206 can be configured to activate the timer upon transmission of request to the external server. The timer can be a hardware or software timer, or some combination thereof. If mobile device 200 receives a conformation that the contact was created, then processor 206 can be configured to store the new contact permanently in memory 208. Alternatively, if processor 206 determines that a confirmation was not received (step 108) before expiration of the timer, then processor 206 can be configured to delete the user contact (step 112).

As described above, the external server receives the request and begins processing the new contact information. Conventionally, the external server also comprises a timer, termed the group creation timer, that is set once the request is received. If one new contact information cannot be verifies, or the new contact cannot be created, before the expiration of the group creation timer, then the process fails and the external server will cease trying to create the new contact. Further, no confirmation is sent to the mobile device Conversely, if the new contact can be verified and created within the time period defined by the group evaluation time, then the new contact will be created and a confirmation sent to the mobile device.

In certain embodiments, therefore, the time included in mobile device 200 will define a time period that is longer than the time period defined by the group creation timer included on the server. This is obviously ensures that the external server has sufficient time to verify and create the user contact and send the confirmation before the mobile device deletes the new contact.

Figure 3:
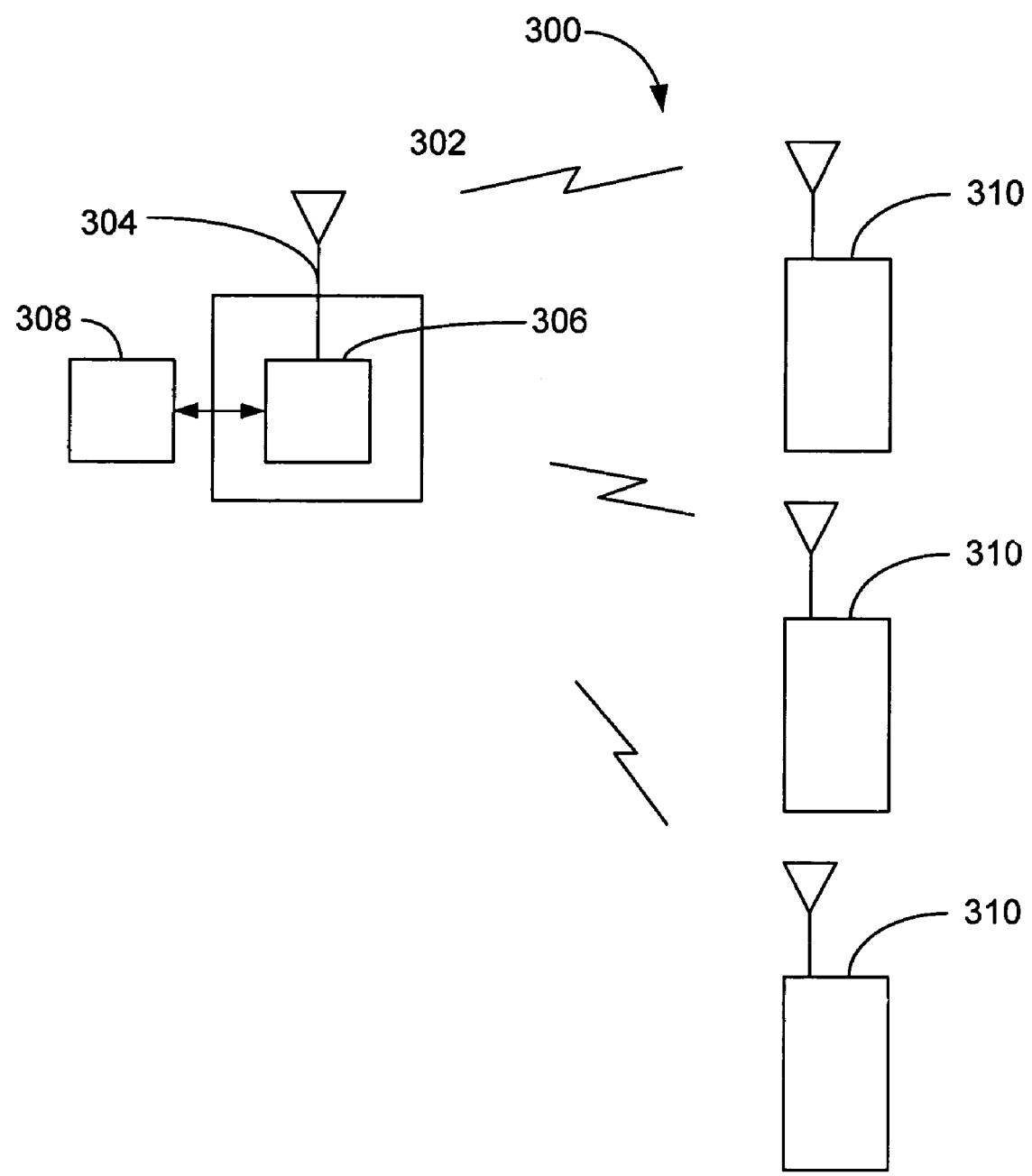
FIG. 3 is a diagram illustrating a mobile communication system.

As illustrated in FIG. 3, which depicts an exemplary wireless communication system 300, an external server 308 can be communicated either one or more mobile devices 310 via one or more base stations 302. Thus, mobile device 310 can be configured to transmit request to base station 302 as described above. Base station 302 can receive the requests via antenna 304 and process them using radio 306. The processed requests can then be forwarded to server 308 for handling. Similarly, confirmations can be sent from server 308 to base station 302 for processing and transmission to mobile devices 310.

While certain embodiments have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed is:

1. A mobile device comprising:
   a transceiver; and
   a processor, coupled with the transceiver and configured to perform the following steps:
   process a request from a user to create a contact;
   store contact information related to the request in a memory connected to the processor for a predetermined time period;
   transmit the request to a server via the transceiver;
   determine whether a confirmation has been received via the transceiver from the server prior to the expiration of the predetermined period; and
   when no confirmation has been received prior to expiration of the predetermined time period, delete the contact information from the memory responsive to the determination.

2. The mobile device of claim 1, wherein the contact comprises a group of contacts.

3. The mobile device of claim 1, wherein the predetermined time period is greater than a group creation time.

4. The mobile device of claim 1, wherein the predetermined time period is equal to a group creation time.

5. The mobile device of claim 1, wherein the processor comprises a microprocessor.

6. The mobile device of claim 1, wherein the processor comprises a mobile station modem.

7. The mobile device of claim 1, wherein the processor comprises a digital signal processor.

8. The mobile device of claim 1, wherein the processor comprises an application specific integrated circuit.

9. The mobile device of claim 1, wherein the processor comprises digital logic.

10. The mobile device of claim 1, further comprising a memory coupled with the processor, the memory configured to store instructions, wherein the processor is configured to access the memory and execute the instructions.

11. The mobile device of claim 10, wherein the memory comprises random access memory.

12. The mobile device of claim 11, wherein the memory comprises flash memory.

13. The mobile device of claim 12 further comprising a timer that defines the predetermined time period, wherein the processor is configured to set the timer when the contact information is stored.

14. The mobile device of claim 11 further comprising a user interface connected to the processor, the user interface configured to allow a subscriber to indicate a desire to create a new contact.

15. The mobile device of claim 14 wherein the user interface is configured to allow a subscriber to enter information related to a new contact.

16. A method of creating a contact on a mobile device comprising the steps of:
   receiving new contact information;
   storing the new contact information for a predetermined time period;
   transmitting a request comprising the new contact information;
   determining whether a confirmation has been received indicating creation of the new contact prior to the expiration of the predetermined period of time;
   when no confirmation has been received prior to the expiration predetermined time period, deleting the contact from the memory responsive to the determination.

17. The method of claim 16 further comprising keep the contact in memory when confirmation has been received prior to the expiration of the predetermined time period.

18. The method of claim 16, wherein the predetermined period of time is greater than a group creation time.

19. The method of claim 16, wherein the predetermined period of time is equal to a group creation time.

20. A mobile communication system comprising:
   a base station comprising a transceiver configured to send and receive wireless signals, and to process received signals;
   a server coupled with the base station, the server configured to receive processed signals related to contact creation and to return a confirmation to the base station when contact is successfully created; and
   a mobile device, comprising a transceiver, the mobile device configured to transmit to the server through the transceiver and further configured to perform the following steps:
   process a request from a user to create a contact;
   store the contact in a memory in the mobile device for a predetermined period of time;
   transmit the request to the server via the base station;
   determine whether a confirmation has been received from the server prior to the expiration of the predetermined period of time; and in the event no confirmation has been received prior to the expiration of the predetermined period, then delete the contact from the memory responsive to the determination.

21. The mobile communication system of claim 20, wherein the predetermined period of time is greater than a group creation time.

22. The mobile communication system of claim 20 wherein the predetermined period of time is equal to a group creation time.

23. A computer readable medium embodying instructions performing a method of operating a mobile device, the method comprising the steps of:

processing a request from a user to create a contact;

storing the contact in a memory connected to the processor for a predetermined period of time;

transmitting the request to a server;

determining whether a confirmation has been received from the server prior to the expiration of the predetermined period of time; and in the event no confirmation has been received prior to the expiration of the predetermined period, then delete the contact from the memory responsive to the determination.

24. The computer readable medium of claim 23, wherein the computer readable medium comprises a memory.

* * * * *